(12) United States Patent
Suciu et al.

(10) Patent No.: US 9,897,040 B2
(45) Date of Patent: Feb. 20, 2018

(54) REAR MOUNTED REVERSE CORE ENGINE THRUST REVERSER

(71) Applicant: United Technologies Corporation, Hartford, CT (US)

(72) Inventors: Gabriel L. Suciu, Glastonbury, CT (US); Jesse M. Chandler, South Windsor, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 909 days.

(21) Appl. No.: 14/190,171

(22) Filed: Feb. 26, 2014

(65) Prior Publication Data

US 2014/0250863 A1    Sep. 11, 2014

Related U.S. Application Data

(60) Provisional application No. 61/773,900, filed on Mar. 7, 2013.

(51) Int. Cl.
*F02K 1/60* (2006.01)

(52) U.S. Cl.
CPC ............ *F02K 1/60* (2013.01); *F05D 2210/40* (2013.01); *F05D 2250/314* (2013.01)

(58) Field of Classification Search
CPC ..... F02K 1/60; F02K 1/52; F02K 1/54; F02K 1/64; F02K 1/62; F01D 13/003; F01D 13/006; F05D 2250/314; F05D 2210/40; B64D 29/04; B64D 29/06; B64D 27/20; B64D 27/14; B64D 27/08

See application file for complete search history.

(56) References Cited

U.S. PATENT DOCUMENTS

| | | | |
|---|---|---|---|
| 5,943,856 A | 8/1999 | Lillibridge et al. | |
| 6,837,038 B2* | 1/2005 | Eiler | B64D 27/02 239/265.17 |
| 6,845,945 B1* | 1/2005 | Smith | B64D 33/04 239/265.19 |
| 7,770,377 B2* | 8/2010 | Rolt | F02K 3/06 60/226.1 |
| 7,802,757 B2* | 9/2010 | Dooley | F01D 15/10 244/60 |
| 8,051,639 B2 | 11/2011 | Lair | |
| 8,104,261 B2 | 1/2012 | Marshall et al. | |
| 8,109,466 B2 | 2/2012 | Aten et al. | |
| 8,151,551 B2 | 4/2012 | Pero | |
| 8,172,175 B2 | 5/2012 | Lair | |

(Continued)

*Primary Examiner* — Christopher Besler
(74) *Attorney, Agent, or Firm* — Kinney & Lange, P.A.

(57) ABSTRACT

In one embodiment, a gas turbine engine for mounting to a rear of an aircraft fuselage has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a vertical deployed position in which the door inhibits a flow to provide a thrust reverse of the flow.

13 Claims, 5 Drawing Sheets

(56) References Cited

U.S. PATENT DOCUMENTS

| | | | |
|---|---|---|---|
| 8,176,725 B2 | 5/2012 | Norris et al. | |
| 8,276,362 B2 | 10/2012 | Suciu et al. | |
| 8,336,289 B2 * | 12/2012 | Roberge | F02C 3/113 60/263 |
| 8,684,302 B2 * | 4/2014 | Chanez | B64C 1/0009 137/15.1 |
| 8,726,633 B2 * | 5/2014 | Roberge | F02C 3/113 60/226.1 |
| 8,789,354 B2 * | 7/2014 | Suciu | F02K 3/025 60/224 |
| 8,955,304 B2 * | 2/2015 | Suciu | F02K 3/06 60/224 |
| 9,291,101 B2 * | 3/2016 | Florea | B64D 27/20 |
| 9,352,843 B2 * | 5/2016 | Suciu | B64D 27/14 |
| 2006/0185346 A1 * | 8/2006 | Rolt | F02K 3/06 60/224 |
| 2008/0191087 A1 * | 8/2008 | Cros | B64C 5/06 244/15 |
| 2009/0056309 A1 * | 3/2009 | Roberge | F02C 3/113 60/263 |
| 2009/0126341 A1 * | 5/2009 | Lair | F02K 1/60 60/226.2 |
| 2013/0025286 A1 | 1/2013 | Kupratis | |
| 2013/0056554 A1 * | 3/2013 | Guillois | B64D 33/04 239/265.19 |
| 2013/0205747 A1 * | 8/2013 | Suciu | F02K 3/06 60/39.15 |
| 2013/0255224 A1 * | 10/2013 | Kupratis | F02C 6/02 60/226.1 |
| 2014/0169957 A1 * | 6/2014 | Kanjiyani | F01D 1/04 415/202 |
| 2016/0102634 A1 * | 4/2016 | Suciu | F01D 13/003 60/262 |

* cited by examiner

REAR MOUNTED REVERSE CORE ENGINE THRUST REVERSER

CROSS-REFERENCE TO RELATED APPLICATION(S)

This application claims priority from U.S. Provisional Application No. 61/773,900, filed Mar. 7, 2013, for "REAR MOUNTED REVERSE CORE ENGINE THRUST REVERSER".

BACKGROUND

This application relates generally to a gas turbine engine for an aircraft, and more specifically, to the inclusion of a thrust reverser at a rear end of a gas turbine engine mounted to a rear of the aircraft.

Gas turbine engines typically include a fan delivering air into a compressor section and also outwardly of the compressor as bypass air. Air from the compressor section passes into a combustor, is mixed with fuel, and ignited. Products of this combustion pass downstream over turbine rotors, driving them to rotate.

In typical gas turbine engines, the fan is positioned axially at a forward end of an engine, and a compressor section is attached downstream thereto. A combustor section and turbine section are located downstream of the compressor section in axial alignment so that the compressor section is nearer the fan than the combustor section or turbine section. In a reverse flow gas turbine engine, the turbine section is adjacent the fan, and the combustor section is at an inner end of the turbine section, with the compressor positioned farthest from the fan.

A thrust reverser is utilized once an aircraft carrying the gas turbine engine has touched down during a landing operation, and acts to create a reverse force to slow the aircraft.

One concept that has been proposed in gas turbine engines is a thrust reverser provided by pivoting shell halves at the rear of the turbine section. Such thrust reversers were generally utilized in prior gas turbine engines which used little, or no, bypass air. That is, the thrust reverser only blocked (reversed) the turbine flow. For bypass engines, a second thrust reverser is typically present in the nacelle to block the bypass flow adjacent the fan exit.

In addition, various types of thrust reversers have been incorporated into more modern gas turbine engines which do have a large fan providing bypass air as propulsion, and in addition to the air passing through the compressor. However, this standard type of gas turbine engine generally had an engine core that extended beyond the end of the fan nozzle, such that the shell halves could not pivot inwardly to a thrust reverse position.

SUMMARY

In one embodiment, a gas turbine engine for mounting to a rear of an aircraft fuselage has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a vertical deployed position in which the door inhibits a flow to provide a thrust reverse of the flow.

In another embodiment, an aircraft has a main body fuselage and a gas turbine engine attached thereto. The gas turbine engine has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a vertical deployed position in which the door inhibits a flow to provide a thrust reverse of the flow.

In yet another embodiment, a gas turbine engine for mounting to a rear of an aircraft fuselage includes a propulsor and an engine core mounted at an angle to the propulsor. The engine core includes a compressor section, a combustor section, and a turbine section, with the turbine section being closer to the propulsor than the compressor section. The engine core is aerodynamically connected to the propulsor. A nacelle positioned around the propulsor and engine core, and is attached to the wing of the aircraft. A downstream end of the nacelle has at least one pivoting door with an actuation mechanism to pivot the door between a stowed position and a vertical deployed position in which the door inhibits a flow to provide a thrust reverse of the flow. When the door is in the deployed position, the door does not contact the engine core or block airflow into the compressor section of the engine core.

DETAILED DESCRIPTION

Traditional engines have an axial flow orientation with the turbine exit (core exit) facing aft due to the in-line axial arrangement. Typically such an arrangement has two thrust reversers: a first reverser for the bypass fan (propulsor), and a second reverser for the engine core (gas generator). A reverse core engine may have an angled core that allows for a single thrust reverser without issues associated with the long axial in-line designs of prior engines. For an arrangement of conjoined engines mounted to the rear of an aircraft, the thrust reversers are in a vertical arrangement when deployed.

Figure 1:
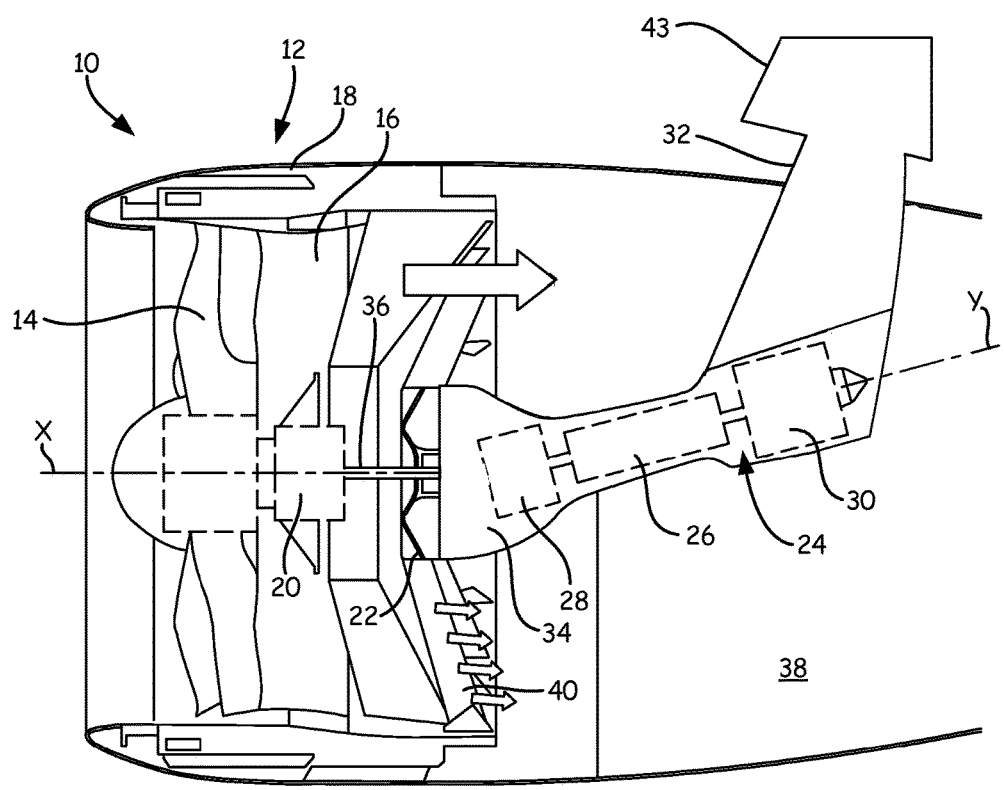
In FIG. 1 is a cross-sectional view of a reverse core engine.

FIG. 1 is a schematic view of a reverse core engine. Engine 10 includes a propulsor 12 at a forward end which is centered for rotation about an axis X. Propulsor 12 includes a fan 14 and a nozzle 16 rearward thereof surrounded by a nacelle 18. Axis X is also a central axis of the fan and the nozzle. Engine 10 may include a gear reduction 20 driven by a power turbine section 22 to drive the fan 14.

A core engine 24 includes combustion section 26 positioned between a turbine section 28 and a compressor section 30. The core engine 24 may also be referred to as the gas generator of the turbine engine. Air passes into an inlet duct 32 to be delivered to the compressor 30. The duct 32 has a limited cross sectional area. At other circumferential locations within nacelle 18, air flows as bypass air for propulsion. The air is compressed and delivered into combustion section 26, where it mixes with fuel and is ignited. Products of this combustion pass through turbine section 28, which drives compressor section 30. The products of combustion then pass through a transition duct 34 over power turbine section 22, to drive the fan 14 that is connected by thereto by a propulsor shaft 36. Air then exits the power turbine 22 and is exhausted therefrom, such as by having a turbine nozzle that directs the flow aftward upon leaving the power turbine 22. The exhaust from the core engine 24 may be mixed with the bypass flow from the propulsor 12 as it leaves the power turbine 22, creating a single exhaust airflow from engine 10.

The illustrated gas turbine engine is a "reverse flow engine" in that the compressor 30 is positioned further into (forward to aft) the engine than is the turbine 28. That is, the turbine section 28 is closest to the propulsor 12, the combustor section 26 and the compressor section 30 are positioned further away in the downstream or aft direction of the propulsor 12 relative to the turbine section 28.

The engine 10 is positioned such that the fan 12, the gear 20, and the power turbine 22 are positioned centered on the axis X, while the core engine 24, including the compressor section 26, the combustor section 24, and the turbine section 28, is positioned on a non-parallel axis Y. The core engine 24 may be mounted in some manner to the nozzle 16, such as through transition duct 34.

In an engine that is reverse flow, and in particular in one wherein the axes X and Y are not parallel, a relatively long core engine 24 can be achieved without the core engine blocking the exit area 38. However, the overall length of the engine 10 is reduced as the core engine 24 is mounted at an angle with respect to the propulsor 12.

Figure 2:
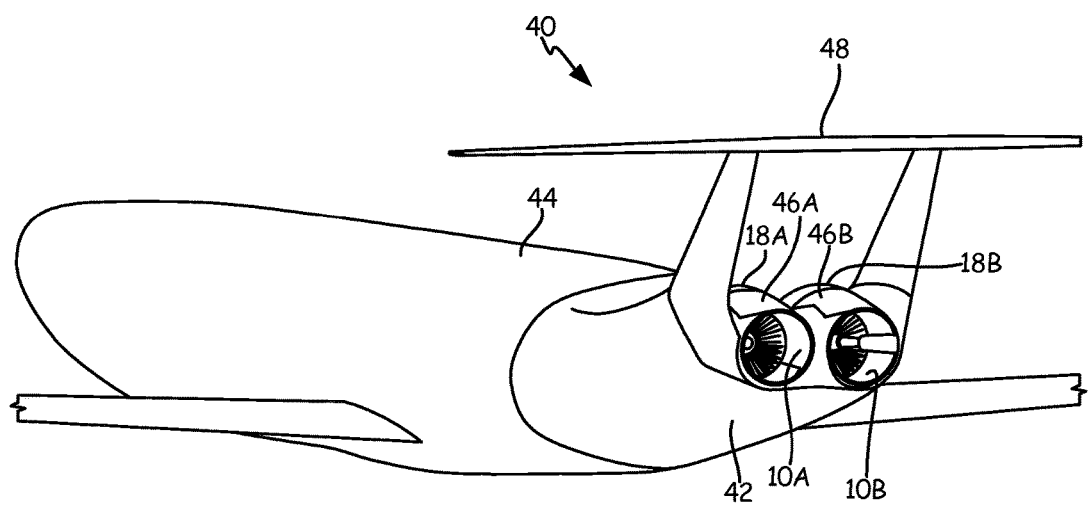
FIG. 2 is a perspective view of an aircraft with conjoined engines mounted on the rear of the fuselage.
Figure 2A:
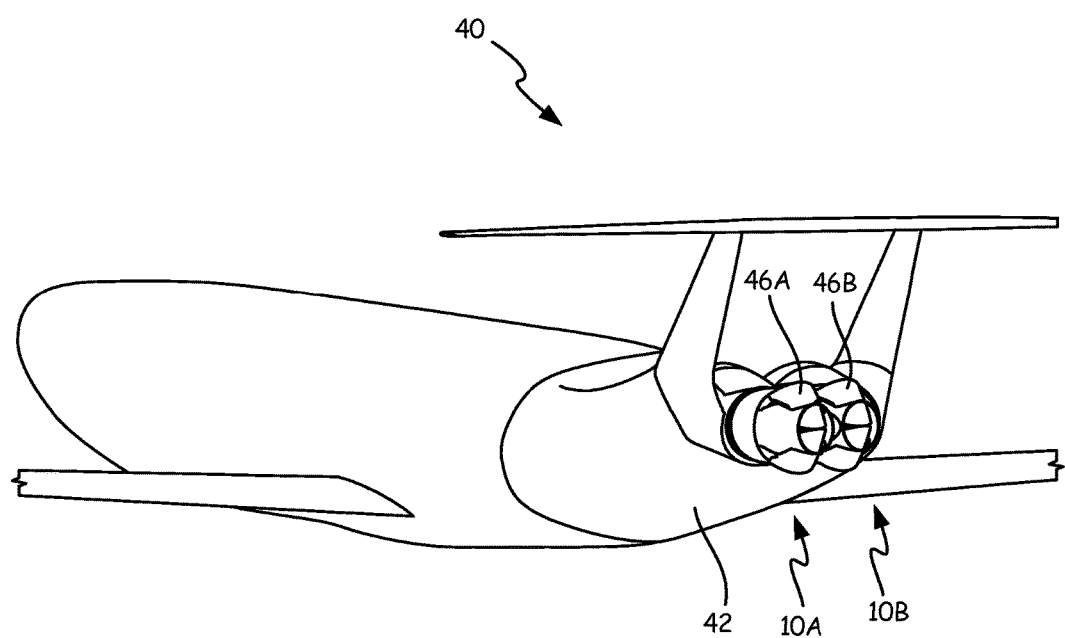
FIG. 2A is a perspective of the aircraft with conjoined engines with thrust reversers in a deployed position.

FIG. 2 illustrates an aircraft 40 with conjoined engines 10A and 10B mounted on a rear 42 of a fuselage 44. The aircraft has engine mount locations for engines 10A and 10B between a portion of a tail 48. At the mounting location, certain positioning restrictions are present on the engine. Conjoined engines 10A and 10B each have nacelles 18A and 18B that are attached to, or that include, thrust reversers 46A and 46B. The thrust reversers 46A and 46B contain flow blocking doors that may be deployed to inhibit and reverse the flow of the engines 10A and 10B, as illustrated in FIG. 2A.

Figure 3:
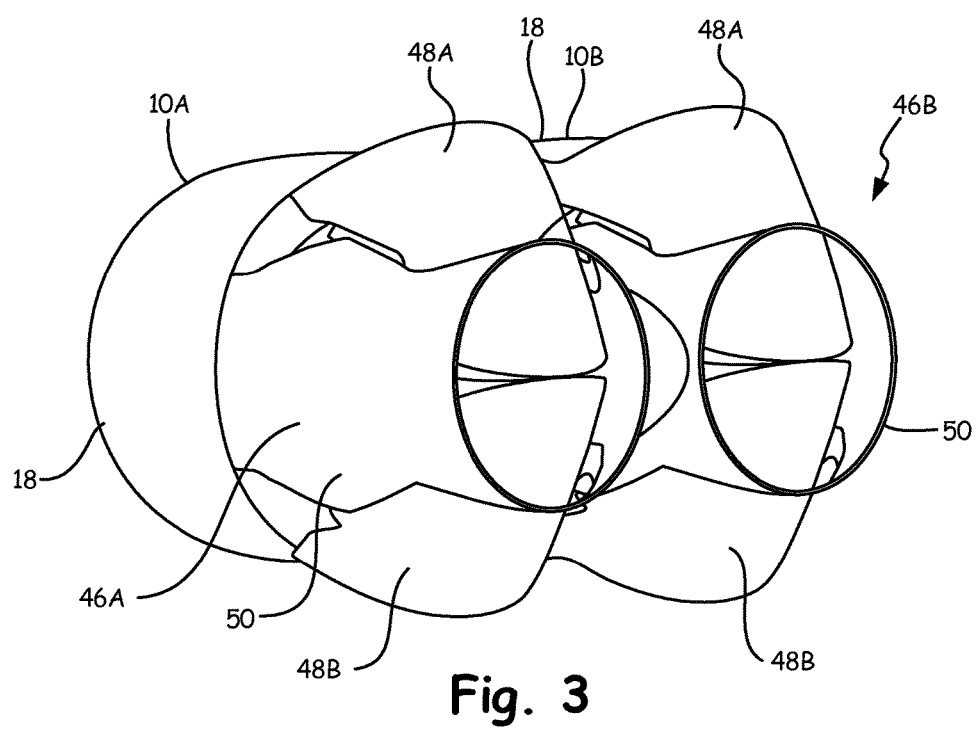
FIG. 3 is a perspective view of the conjoined engines with a thrust reverser in a deployed position.

FIG. 3 is a perspective view of the conjoined engines 10A and 10B with the thrust reversers 46A and 46B in a deployed position. A portion of the nacelle 18 covers the propulsor 12 (not visible). The thrust reversers 46A and 46B are mounted aft of the portion of the nacelle 18 covering the propulsor 12 of each respective engine 10A and 10B.

Figure 4:
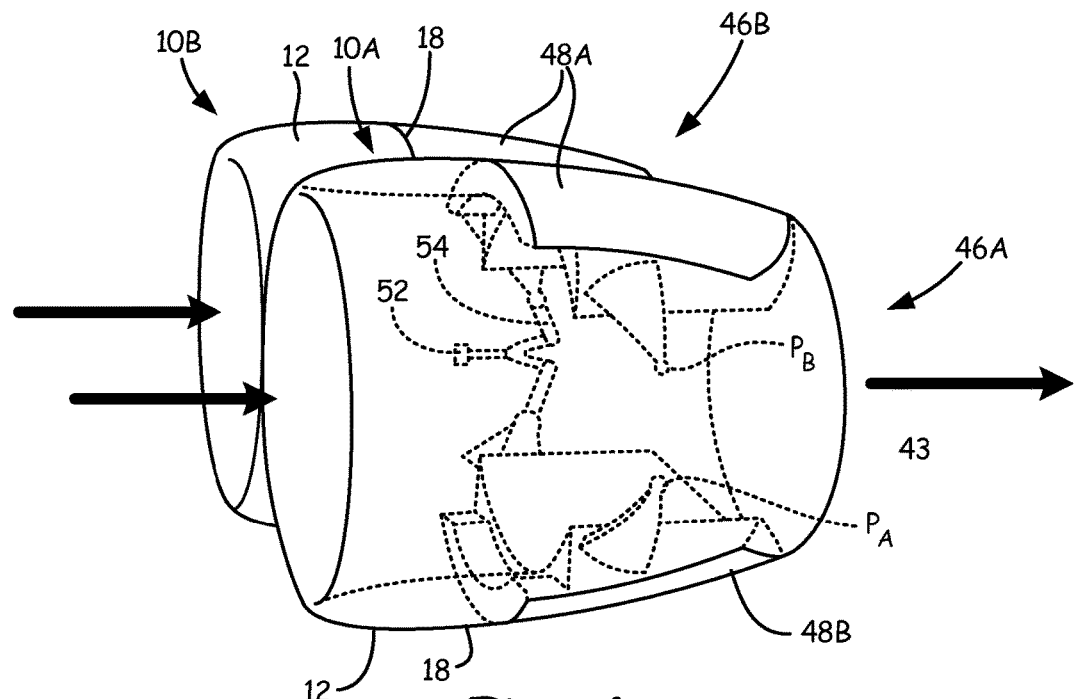
FIG. 4 is a perspective view of the reverse core engine with a thrust reverser in a stowed position.

The thrust reversers 46A and 46B are each comprised of two pivoting doors 48A and 48B connected to a linkage system 54 driven by an actuation mechanism 52 (see FIG. 4). The doors 48A and 48B are held by a frame 50 that is attached as part of the nacelle 18, or that acts as a separate cowling for the core engine 24. The doors 48A and 48B pivot about points that permit the aft edges thereof to contact when deployed, which may be referred to as a clam shell arrangement. The downstream end of the doors 48A and 48B are curved, reflecting the dual use (i.e., as an airflow blocker in the deployed position and as a bypass conduit in the stowed position). In the deployed position, continued thrust from the engine will create a force resisting forward movement of the aircraft 40.

Figure 5:
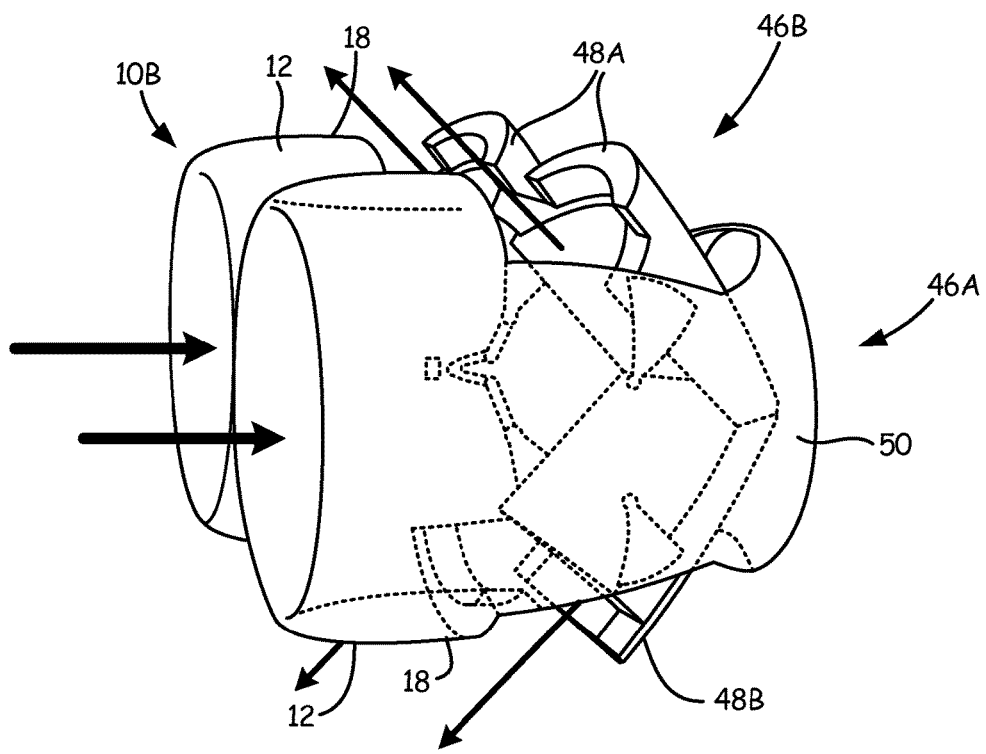
FIG. 5 is a perspective view of the reverse core engine with a thrust reverser in a deployed position.

FIG. 4 is a perspective view of the reverse core engines 10A and 10B with the thrust reversers 46A and 46B in a stowed position, and FIG. 5 is a perspective view of the reverse core engines 10A and 10B with the thrust reversers 46A and 46B in the deployed position. The propulsor 12 is within the nacelle 18, and the core engine 24 is shown in phantom. As previously noted, the thrust reversers 46 are comprised of two pivoting doors 48A and 48B connected to a linkage system 54 driven by an actuation mechanism 52 (see FIG. 4). The doors 48A and 48B are held by a frame 50 that is attached as part of the nacelle 18, or that acts as a separate cowling for the core engine 24. The doors 48A and 48B pivot about points that $P_A$ and $P_B$ permit the aft edges thereof to contact when deployed, which may be referred to as a clam shell arrangement. The actuation mechanism 52 is fixed within the nacelle 18, and may be a hydraulic actuator, electric screw actuator, or any similar structure known to those in the art. The linkage system 54 may be a series of pivoting rods or bars, or similar structures also known to those in the art. Although illustrated with two pivoting doors in a clam shell configuration, it is envisioned that three or more doors may be used so long as the doors do not interfere with the core engine 24.

The position illustrated in FIG. 4 is the normal flight position. Once an aircraft associated with the engine 10 has landed, the actuation mechanism 52 drives the linkage system 50 into a deployed position of FIG. 5, in which the doors 48A and 48B are pivoted to a deployed position to block the exit area of the engine 10. The propulsor 12 and turbine section 28 continue to deliver exhaust gas against the deployed doors 48A and 48B, and create a reverse thrust tending to slow the aircraft.

In the disclosed arrangement, the engines 10 are conjoined and mounted to the rear 42 of the aircraft 40, the core engine 24 is angled to be generally parallel with the ground, with the compressor section inlet 43 on the outer sides of the engines 10A and 10B with respect to the aircraft 40. With this configuration, the pivoting doors 48A and 48B are centrally located adjacent either at the top dead center or bottom dead center of the engines 10A and 10B. When deployed, the thrust reverser 46 will move the pivoting doors 48A and 48B in a general vertical direction.

Once in the deployed position, the doors 48A and 48B will block both the bypass flow from the propulsor and the exit flow from the turbine. The angle of the core engine 24 allows for the full closure or pivoting of the doors 48A and 48B behind the core engine 24 while not interfering or disrupting inlet flow from the side thereof, or contacting the core engine 24 in the deployed position. The angled core engine 24 shortens the overall length of the engine 10. The system provides enhanced thrust reverse for the engine 10 as only one structure is needed to block both bypass flow and core engine exhaust flow due to the shortened length of the engine, along with the mixing of the bypass flow with the core engine exhaust flow adjacent the exit of the turbine section 28 of the core engine 24. Further, fewer parts are required for the engine as the doors of the thrust reverser are incorporated into the nacelle or cowl and serve a dual function. As a result, the weight of the engine is greatly reduced, and thus the thrust reverser 46 arrangement proportionally reduces the amount of fuel burned during flight.

The vertical operation of the thrust reversers 46A and 46B also allow for the conjoined arrangement of the engines 10A and 10B at the rear 42 of the aircraft 40. The configuration of putting multiple engines at the rear of an aircraft creates an issue with operable space for deploying the thrust reversers of adjacent engines. Although illustrated as two engines, three or more engines could be mounted to the back of the aircraft in varying arrangements (in a line, in an arc, in a pyramid, etc.) without the worry of thrust reversers interfering with adjacent engines.

Discussion of Possible Embodiments

The following are non-exclusive descriptions of possible embodiments of the present invention.

In one embodiment, a gas turbine engine for mounting to a rear of an aircraft fuselage has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a vertical deployed position in which the door inhibits a flow to provide a thrust reverse of the flow.

The gas turbine engine of the preceding paragraph can optionally include, additionally and/or alternatively, any one or more of the following features, configurations and/or additional components: \ wherein the first axis and second axis are non-parallel;

wherein the propulsor delivers bypass air of the engine;

wherein the downstream end of the nacelle has a plurality of pivoting doors;

wherein each of the plurality of pivoting doors are driven by the actuation mechanism to move between the stowed position and the deployed position to provide thrust reverse of the flow;

wherein the plurality of doors are positioned in a clamshell arrangement; and/or wherein the flow includes a bypass flow from the propulsor and an exit flow from the engine core.

In another embodiment, an aircraft has a main body fuselage and a gas turbine engine attached thereto. The gas turbine engine has a propulsor that rotates on a first axis, and an engine core including a compressor section, a combustor section, and a turbine section, with the turbine section being closer to the propulsor than the compressor section. The engine core is aerodynamically connected to the propulsor and has a second axis. A nacelle is positioned around the propulsor and engine core. The nacelle is attached to the wing of the aircraft. A downstream end of the nacelle has at least one pivoting door with an actuation mechanism to pivot the door between a stowed position and a vertical deployed position in which the door inhibits a flow to provide a thrust reverse of the flow.

The aircraft of the preceding paragraph can optionally include, additionally and/or alternatively, any one or more of the following features, configurations and/or additional components:

wherein the first axis and second axis are non-parallel;

wherein the propulsor delivers bypass air of the engine;

wherein the downstream end of the nacelle has a plurality of pivoting doors;

wherein each of the plurality of pivoting doors are driven by the actuation mechanism to move between the stowed position and the vertical deployed position to provide thrust reverse of the flow;

wherein the plurality of pivoting doors are positioned in a clamshell arrangement;

wherein the flow includes a bypass flow from the propulsor and an exit flow from the engine core;

a second engine adjacent the first engine, the second engine including: a propulsor that rotates on a third axis; an engine core including a compressor section, a combustor section, and a turbine section, with the turbine section being closer to the propulsor than the compressor section, the engine core being aerodynamically connected to the propulsor and having a fourth axis; and a nacelle positioned around the propulsor and engine core, wherein a downstream end of the nacelle has at least one pivoting door with an actuation mechanism to pivot the at least one door between a stowed position and a vertical deployed position in which the at least one door inhibits a flow to provide a thrust reverse of the flow;

a power turbine positioned downstream of the turbine section of the engine core; and a gear reduction between the power turbine and a fan of the propulsor to cause the fan to rotate at a slower speed than the power turbine;

wherein the engine core turbine section and said power turbine are separate turbines; and/or wherein the power turbine rotates on the first axis.

In yet another embodiment, a gas turbine engine for mounting to a rear of an aircraft fuselage includes a propulsor and an engine core mounted at an angle to the propulsor. The engine core includes a compressor section, a combustor section, and a turbine section, with the turbine section being closer to the propulsor than the compressor section. The engine core is aerodynamically connected to the propulsor. A nacelle positioned around the propulsor and engine core, and is attached to the wing of the aircraft. A downstream end of the nacelle has at least one pivoting door with an actuation mechanism to pivot the door between a stowed position and a vertical deployed position in which the door inhibits a flow to provide a thrust reverse of the flow. When the door is in the deployed position, the door does not contact the engine core or block airflow into the compressor section of the engine core.

Although the present invention has been described with reference to preferred embodiments, workers skilled in the art will recognize that changes may be made in form and detail without departing from the spirit and scope of the invention.

The invention claimed is:

1. A gas turbine engine for mounting to a rear of an aircraft fuselage comprising:

a propulsor that rotates on a first axis, the propulsor including a power turbine and a fan driven by the power turbine;

an engine core including a compressor section, a combustor section, and a turbine section, with the turbine section being closer to the propulsor than the compressor section, the engine core being aerodynamically connected to the propulsor and having a second axis, the propulsor disposed axially forward of the engine core and configured to provide air to the engine core, wherein an exit flow from the engine core is directed afterward upon leaving the power turbine; and a nacelle positioned around the propulsor and engine core, the nacelle attached to the fuselage of the aircraft, wherein a downstream end of the nacelle has a plurality of pivoting doors with an actuation mechanism to pivot each of the plurality of pivoting doors between a stowed position and a vertical deployed position in which the plurality of pivoting doors inhibit a flow to provide a thrust reverse of the flow;

wherein the plurality of doors are positioned in a clamshell arrangement such that an aft end of a first one of the plurality of pivoting doors contacts an aft end of a second one of the plurality of pivoting doors in the vertical deployed position.

2. The gas turbine engine of claim 1, wherein the first axis and second axis are non-parallel.

3. The gas turbine engine of claim 1, wherein the propulsor delivers bypass air of the engine.

4. The gas turbine engine of claim 1, wherein the flow includes a bypass flow from the propulsor and an exit flow from the engine core.

5. An aircraft comprising:
a main body fuselage; and
a gas turbine engine mounted to the main body fuselage, the gas turbine engine including:
a propulsor that rotates on a first axis, the propulsor including a power turbine and a fan driven by the power turbine;
an engine core including a compressor section, a combustor section, and a turbine section, with the turbine section being closer to the propulsor than the compressor section, the engine core being aerodynamically connected to the propulsor and having a second axis, the propulsor disposed axially forward of the engine core and configured to provide air to the engine core, wherein an exit flow from the engine core is directed afterward upon leaving the power turbine; and
a nacelle positioned around the propulsor and engine core, wherein a downstream end of the nacelle has a plurality of pivoting doors with an actuation mechanism to pivot each of the plurality of pivoting doors between a stowed position and a vertical deployed position in which the plurality of pivoting doors inhibit a flow to provide a thrust reverse of the flow;
wherein the plurality of doors are positioned in a clamshell arrangement such that an aft end of a first one of the plurality of pivoting doors contacts an aft end of a second one of the plurality of pivoting doors in the vertical deployed position.

6. The aircraft of claim 5, wherein the first axis and second axis are non-parallel.

7. The aircraft of claim 5, wherein the propulsor delivers bypass air of the engine.

8. The aircraft of claim 5, wherein the flow includes a bypass flow from the propulsor and an exit flow from the engine core.

9. The aircraft of claim 5 further comprising:
a second engine adjacent the gas turbine engine, the second engine including:
a propulsor that rotates on a third axis;
an engine core including a compressor section, a combustor section, and a turbine section, with the turbine section being closer to the propulsor than the compressor section, the engine core being aerodynamically connected to the propulsor and having a fourth axis; and
a nacelle positioned around the propulsor and engine core, wherein a downstream end of the nacelle has at least one pivoting door with an actuation mechanism to pivot the at least one door between a stowed position and a vertical deployed position in which the at least one door inhibits a flow to provide a thrust reverse of the flow.

10. The aircraft as set forth in claim 5, further comprising:
a power turbine positioned downstream of the turbine section of the engine core; and
a gear reduction between the power turbine and a fan of the propulsor to cause the fan to rotate at a slower speed than the power turbine.

11. The aircraft as set forth in claim 10, wherein the engine core turbine section and said power turbine are separate turbines.

12. The aircraft as set forth in claim 11, wherein the power turbine rotates on the first axis.

13. A gas turbine engine for mounting to a rear of an aircraft fuselage comprising:
a propulsor;
an engine core mounted at an angle to the propulsor, the engine core including a compressor section, a combustor section, and a turbine section, with the turbine section being closer to the propulsor than the compressor section, the engine core being aerodynamically connected to the propulsor, the propulsor including a power turbine and a fan driven by the power turbine, the propulsor disposed axially forward of the engine core and configured to provide air to the engine core, wherein an exit flow from the engine core is directed afterward upon leaving the power turbine; and
a nacelle positioned around the propulsor and engine core, the nacelle attached to the fuselage of the aircraft;
wherein a downstream end of the nacelle has a plurality of pivoting doors with an actuation mechanism to pivot the plurality of pivoting doors between a stowed position and a vertical deployed position in which the plurality of pivoting doors inhibit a flow to provide a thrust reverse of the flow; and
wherein when the plurality of pivoting doors are in the deployed position, the plurality of pivoting doors do not contact the engine core or block airflow into the compressor section of the engine core; and
wherein the plurality of doors are positioned in a clamshell arrangement such that an aft end of a first one of the plurality of pivoting doors contacts an aft end of a second one of the plurality of pivoting doors in the vertical deployed position.

* * * * *

UNITED STATES PATENT AND TRADEMARK OFFICE
CERTIFICATE OF CORRECTION

PATENT NO. : 9,897,040 B2
APPLICATION NO. : 14/190171
DATED : February 20, 2018
INVENTOR(S) : Gabriel L. Suciu, Jesse M. Chandler and Brian D. Merry Page 1 of 1

It is certified that error appears in the above-identified patent and that said Letters Patent is hereby corrected as shown below:

In the Claims

Column 6, Line 64:
Delete "afterward"
Insert --aftward--

Column 7, Line 33:
Delete "afterward"
Insert --aftward--

Column 8, Line 37:
Delete "afterward"
Insert --aftward--

Signed and Sealed this
Sixteenth Day of July, 2019

Andrei Iancu
*Director of the United States Patent and Trademark Office*